United States Patent [19]
Le Deit et al.

[11] Patent Number: 5,494,139
[45] Date of Patent: Feb. 27, 1996

[54] CONNECTION DEVICE WITH RESILIENT RETURN

[75] Inventors: Gerard Le Deit, Courtry; Claude Hulliger, Thiers sur Theve; Jean Louis Gerard, Bagnolet, all of France

[73] Assignee: Bendix Europe Services Techniques, Drancy, France

[21] Appl. No.: 90,064

[22] PCT Filed: Jun. 14, 1993

[86] PCT No.: PCT/FR93/00564

§ 371 Date: Jul. 23, 1993

§ 102(e) Date: Jul. 23, 1993

[87] PCT Pub. No.: WO94/01694

PCT Pub. Date: Jan. 20, 1994

[30] Foreign Application Priority Data

Jul. 8, 1992 [FR] France ..................... 92 08421

[51] Int. Cl.⁶ ............. F16D 55/2265; F16B 19/02; E05C 5/02
[52] U.S. Cl. .................. 188/73.38; 188/196 F
[58] Field of Search .............. 188/73.35–73.39, 188/73.34, 73.44, 71.7, 196 F, 205 A

[56] References Cited

U.S. PATENT DOCUMENTS

| | | | |
|---|---|---|---|
| 3,268,034 | 8/1966 | Burnett | 188/71.7 |
| 4,119,180 | 10/1978 | Horie | 188/73.39 X |
| 4,936,422 | 6/1990 | Mery et al. | 188/73.38 |

FOREIGN PATENT DOCUMENTS 2229838  7/1981  Germany .................... 188/73.44

*Primary Examiner*—Josie Ballato
*Attorney, Agent, or Firm*—Leo H. McCormick, Jr.; Larry J. Palguta

[57] ABSTRACT

A combination of a device connecting a yoke (1) and a caliper (2) of a sliding caliper disk-brake includes a key (7) engaged axially in housings of the yoke (1) and caliper (2). The key (7) and one of the housings (10) have non-circular cross-sections and the key (7) is acted upon resiliently by a wire spring (11) of the device so as to reduce the clearance with the housing (10).

4 Claims, 2 Drawing Sheets

CONNECTION DEVICE WITH RESILIENT RETURN

BACKGROUND OF THE INVENTION

The present invention relates to a device for connecting a first and a second part, comprising first and second housings of common axis formed respectively in these first and second parts, as also a key inserted axially into the first housing with a relatively small clearance and into the second housing with a relatively large clearance.

Devices of this type have been used for a very long time in engineering and in all fields of industry.

One particular example thereof is given by Patent U.S. Pat. No. 4,936,422 which relates to a disk-brake with sliding caliper and with single post, and which illustrates the preferred field of application of the present invention.

When it is a question of locking two parts to one another such as the yoke and the sliding caliper of a disk-brake, it is in fact necessary, because of production tolerances, to provide for the key to enter one of the two parts with a relatively large clearance, failing which assembly risks being impossible.

Nevertheless in certain applications, and in particular in the case of brakes also assembled and subjected to extreme conditions of use, the clearance between the key and the second part, therefore between the two parts, is productive of noise and creates a risk of premature wear resulting, at substantial accelerations in alternate directions, from a hammering of the two parts against one another.

The object of the present invention is precisely to avoid this process and to eliminate the effects for which it is responsible.

SUMMARY OF THE INVENTION

To this end, the device of the invention is essentially characterized in that the second housing and the key adopting at least partially the form of cylinders with non-circular bases each of which has different minimal and maximal diameters, the diameters of the second housing being greater than the corresponding diameters of the key and the maximal diameter of the latter being greater than the minimal diameter of the second housing, and in that this device further comprises a retaining member, resting against one of the two parts and exerting on the key a resilient torsional torque about said common axis, tending to align the maximal diameter of the key and the minimal diameter of the second housing.

In the case where the first and second parts are constituted respectively by the yoke and the caliper of a sliding caliper disk-brake, the retaining member is preferably constituted by a wire spring secured to the key and to the yoke respectively at first and second attachment points spaced apart from one another by a portion of length of this wire, and this portion of length extends at least partially in a direction different from that of said common axis so as to be subjected to a flexion during a sliding of the caliper resulting from a braking action, and so as thus to be capable of bringing the latter back at the end of this action.

According to one embodiment which is easy to use, the first attachment point is obtained by inserting the wire spring into a transverse bore made in the key.

If the wire spring is angled at the exit from the transverse bore at such an angle that the sliding of the caliper produces a rotation of the wire spring in the bore, then the wire spring is advantageously pressed onto the yoke at a point of rotation situated, along the length of this wire, between the first and second attachment points, and the second attachment point is situated apart from the plane formed by said common axis and said point of rotation.

DESCRIPTION OF THE DRAWINGS

The invention will now be described by way of example with reference to the accompanying drawings in which.

DESCRIPTION OF THE INVENTION

Figure 1:
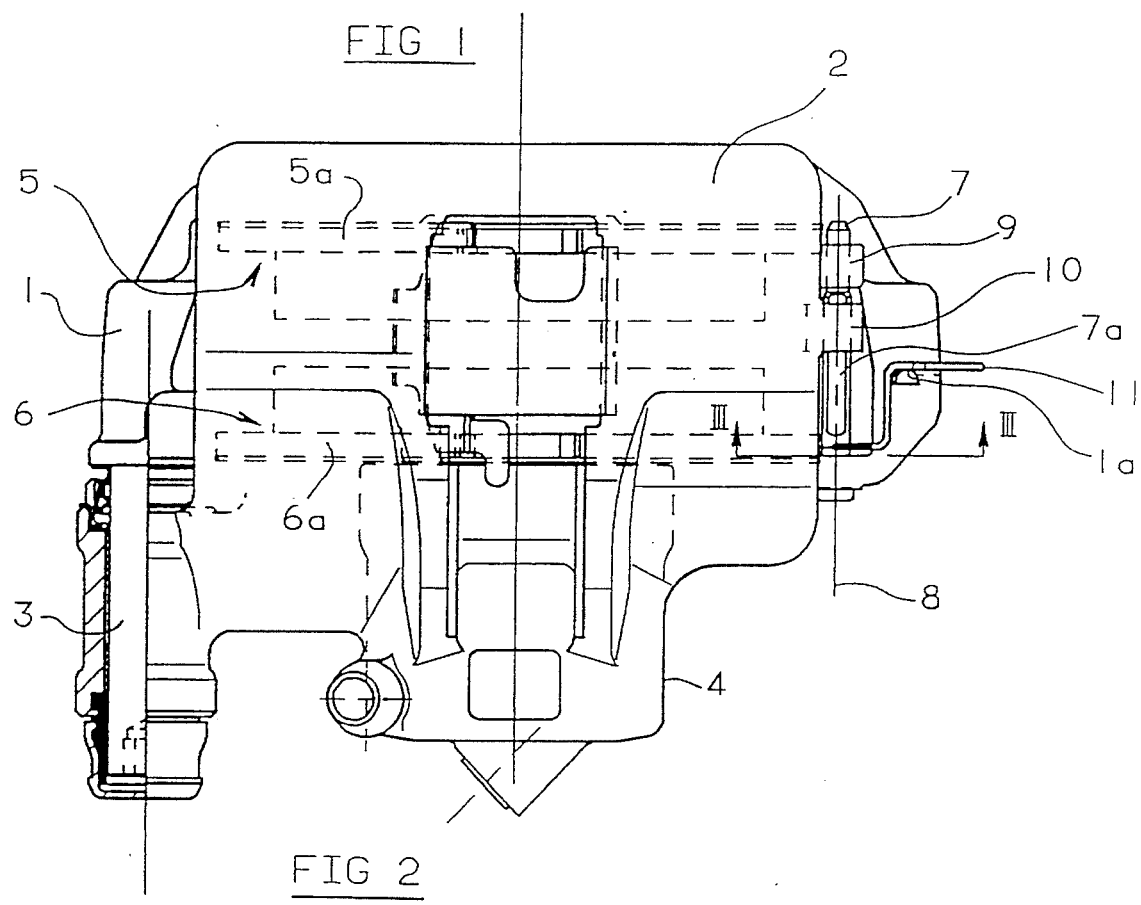
FIG. 1 is a plan view of a sliding caliper disk-brake using a device according to the invention.
Figure 2:
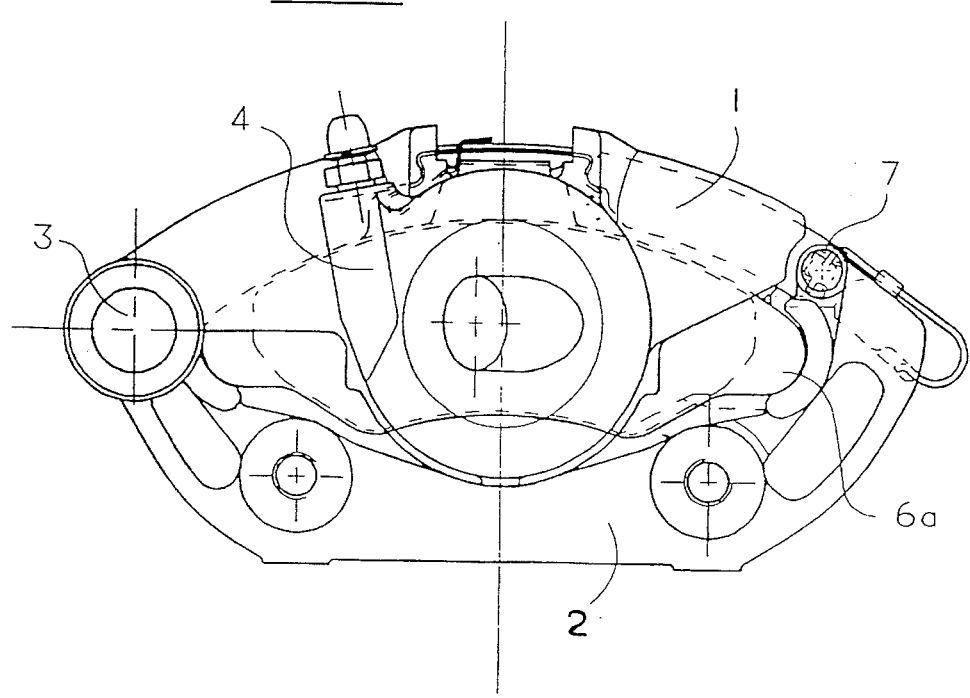
FIG. 2 is a front view of the brake of FIG. 1.

The disk-brake shown in FIGS. 1 and 2 is of the type comprising a yoke 1 and a caliper 2 slideably mounted on this yoke by means of an axial post 3.

A hydraulic brake actuator 4, integral with the caliper 2 is capable of applying onto a disk (not shown), secured to a wheel of a vehicle to be braked, two friction members 5 and 6 mounted on the brake by means of support plates 5a and 6a respectively.

The yoke 1 and the caliper 2, which are capable of turning with respect to one another about the hinge-forming post 3, are locked to one another in rotation by means of a key 7 engaged along an axis 8 in at least one housing 9 of the yoke 1 and a housing 10 of the caliper 2.

Whereas the clearance of the key 7 in the first housing 9 is minute, the clearance of this key in the housing 10 of the caliper is relatively large so as, in particular, to take up the production tolerances of the brake and its deformations under stress.

The object of the invention is in particular to prevent the necessarily large clearance between the key 7 and the housing 10 from becoming, in extreme conditions, a source of noise and a cause of wear.

Figure 3:
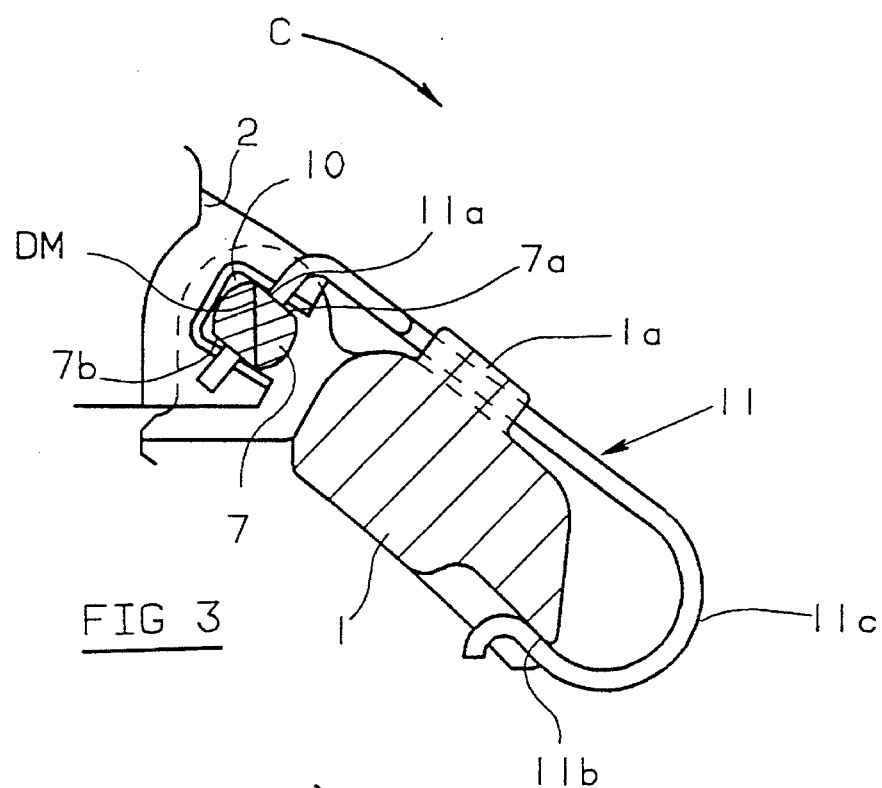
FIG. 3 is a detail view in cross-section along line III—III of FIG. 1.
Figure 4:
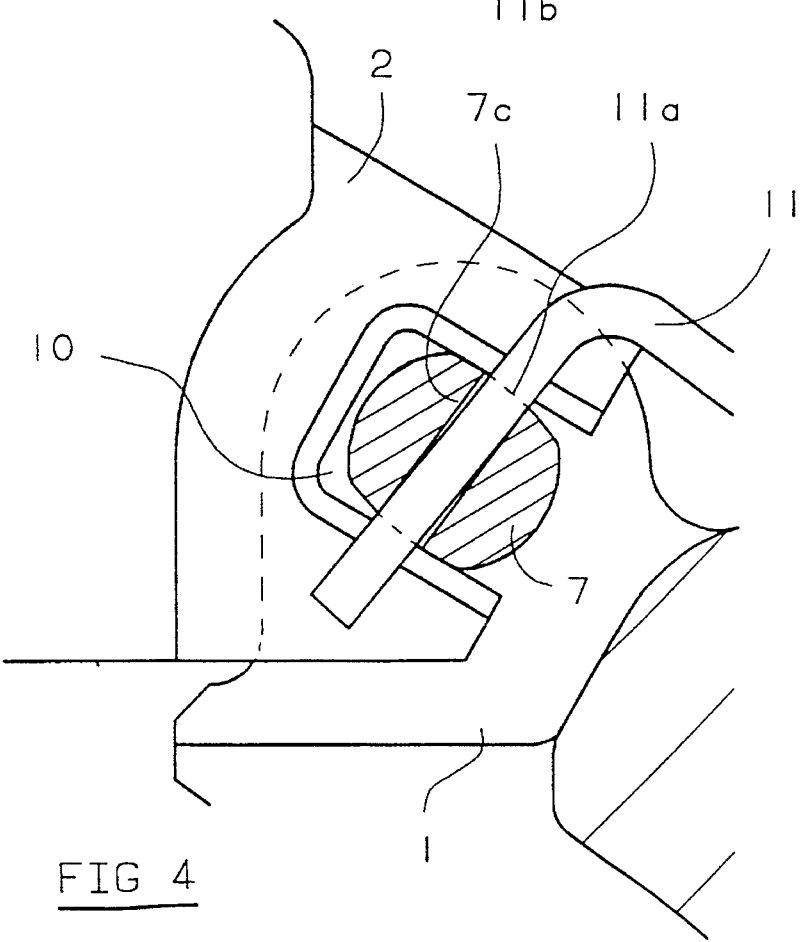
FIG. 4 is a view similar to that of FIG. 3, drawn to an enlarged scale and along a slightly different sectional plane, and showing a key of cross-section also slightly different.

The means used by the invention in order to solve this problem are shown in specific manner by FIGS. 3 and 4.

More precisely, the second housing 10 and the key adopt, at least in their mutual vicinity, the shape of cylinders with non-circular bases, each of which has different minimal and maximal diameters.

In other words, not only does their cross-section adopt a non-circular shape, but in addition two parallel straight lines tangent to this cross-section have between them a separation which varies as a function of their direction.

Because of this, "minimal diameter" here means, for each member in question (namely the key 7 on the one hand and the housing 10 on the other hand), the minimal distance which these two parallel straight lines may have between them while remaining tangent to the cross-section of this member, associated with the direction taken by these two straight lines when they are at this distance from one another.

As will be easily understood, the definition of "maximal diameter" can be extrapolated from the preceding definition.

According to the invention, the minimal and maximal diameters of the second housing 10 are respectively greater than the minimal and maximal diameters of the key 7, but the maximal diameter of the latter is greater than the minimal diameter of the second housing 10.

As shown in FIGS. 1 and 3, the key 7 may for example adopt the shape of a cylinder of circular base modified by two parallel flats 7a and 7b, and the housing 10 may be of essentially rectangular shape and possibly open.

The device of the invention furthermore comprises a retaining member adopting for example the form of a wire spring 11 inserted into a transverse bore 7c of the key 7, the point of insertion constituting a first attachment point 11a for the wire spring 11.

This wire 11, which rests on the yoke at a second attachment point 11b, has the function of exerting on the key 7 a resilient torsional torque, indicated by the arrow C, about the common axis 8, tending to align the maximal diameter DM of the key 7 with the minimal diameter of the second housing, which has the direction of the width of the rectangle which is formed by the latter.

According to another major feature of the invention, the portion of the length of the wire 11 which separates the attachment points 11a and 11b extends at least partially in a direction different from that of the axis 8, so as to be capable of being subjected to a flexion during the sliding of the caliper 2 under the effect of a braking action, and so as thus to be capable of bringing the caliper back at least into the vicinity of its initial position after the end of the braking action.

As shown in FIGS. 3 and 4, the wire spring 11 is for example angled at the exit from the bore 7c and additionally rests (FIGS. 1 and 3) against a point of rotation 1a which is formed by a relief of the yoke 1 and is situated, along the length of the wire 11, between the first and second attachment points 11a, 11b.

In another respect, the wire spring 11 preferably engages the second attachment point 11b through the intermediary of a loop 11c, so that this second attachment point is situated apart from the plane passing through the axis 8 and the point of rotation 1a, which permits a slight action on the wire spring 11 in torsion and increases the capacity of this wire to bring the caliper back into position after a sliding on the post 3.

Lastly, as shown in FIG. 4, the key 7 may advantageously have a cross-section more developed than that of a segment of a circle and particularly a cross-section devoid of angular points.

We claim:

1. A combination of a device connecting a yoke and a caliper of a sliding caliper disk-brake, the combination comprising first and second housings of common axis formed respectively at the yoke and the caliper, a key inserted axially into the first housing with a relatively small clearance and into the second housing with a relatively large clearance, and the device comprising a retaining member for the key, the retaining member being a wire spring, the second housing and the key having at least partially the general form of cylinders with non-circular bases, the second housing and key having respective minimal and maximal diameters, the diameters of the second housing being greater than the respective diameters of the key and the maximal diameter of the key being greater than the minimal diameter of the second housing, the retaining member resting on first and second attachment points at the key and yoke and exerting on the key a resilient torsional torque about said common axis, the resilient torsional torque tending to engage the maximal diameter of the key and the minimal diameter of the second housing.

2. The combination according to claim 1, wherein the wire spring is secured to the key and to the yoke respectively at the first and second attachment points which are spaced apart from one another by a portion of length of the wire spring extending at least partially in a direction different from that of said common axis so that the portion of length of the wire spring is subjected to a flexion during a sliding of the caliper resulting from a braking action and thus capable of returning the caliper at termination of the braking action.

3. The combination according to claim 2, wherein the first attachment point is obtained by inserting the wire spring into a transverse bore of the key.

4. The combination according to claim 3, wherein the wire spring is angled at an exit from said transverse bore and is pressed onto the yoke at a point of rotation of the yoke situated along the length of the wire between the first and second attachment points, and the second attachment point situated apart from a plane formed by said common axis and said point of rotation.

* * * * *